(12) United States Patent
Leuthardt et al.

(10) Patent No.: US 10,592,650 B2
(45) Date of Patent: Mar. 17, 2020

(54) MESSAGE SENDER SECURITY IN MESSAGING SYSTEM

(71) Applicant: FaceToFace Biometrics, Inc., Saint Louis, MO (US)

(72) Inventors: Eric Leuthardt, Saint Louis, MO (US); Scott Stern, Saint Louis, MO (US)

(73) Assignee: FaceToFace Biometrics, Inc., St. Louis, MO (US)

( * ) Notice: Subject to any disclaimer, the term of this patent is extended or adjusted under 35 U.S.C. 154(b) by 127 days.

(21) Appl. No.: 15/786,154

(22) Filed: Oct. 17, 2017

(65) Prior Publication Data
US 2018/0075228 A1 Mar. 15, 2018

Related U.S. Application Data

(63) Continuation of application No. 14/643,800, filed on Mar. 10, 2015, now Pat. No. 9,817,960.
(Continued)

(51) Int. Cl.
*H04N 7/16* (2011.01)
*G06F 17/30* (2006.01)
(Continued)

(52) U.S. Cl.
CPC ............ *G06F 21/32* (2013.01); *G06F 21/606* (2013.01); *G06F 21/6245* (2013.01);
(Continued)

(58) Field of Classification Search
CPC ..... G06F 12/00; G06F 21/79; G06K 9/00892; H04F 221/2143
(Continued)

(56) References Cited

U.S. PATENT DOCUMENTS 6,836,846 B1 * 12/2004 Kanevsky ............... H04L 51/18
707/999.009
6,873,710 B1 3/2005 Cohen-Solal et al.
(Continued)

OTHER PUBLICATIONS

G. Di Crescenzo; Approximate Message Authentication and Biometric Entity Authentication; Springer; pp. 240-254, (Year: 2005).*
(Continued)

*Primary Examiner* — Monjur Rahim
(74) *Attorney, Agent, or Firm* — Armstrong Teasdale LLP

(57) ABSTRACT

Some embodiments include a method of providing security and privacy for a message sender. The method can include a messaging application determining that a messaging interface of the computing device is active and is revealing or about to reveal the electronic message. The messaging application can identify a recipient account of a messaging server system that is associated with the electronic message according to the electronic message or the messaging server system. The messaging application can then monitor a data feed from a sensor of the computing device to detect a biometric pattern that matches against a biometric profile model associated with the recipient account utilizing a biometric recognition process. In response to determining that the detected biometric pattern does not match the biometric profile model associated with the recipient account, the messaging application can activate a privacy shield to prevent content of the electronic message from being revealed.

20 Claims, 8 Drawing Sheets

Related U.S. Application Data

(60) Provisional application No. 61/950,423, filed on Mar. 10, 2014, provisional application No. 61/985,059, filed on Apr. 28, 2014, provisional application No. 62/042,561, filed on Aug. 27, 2014.

(51) Int. Cl.

| | | |
|---|---|---|
| *G06F 7/04* | (2006.01) | |
| *G06F 21/32* | (2013.01) | |
| *G06F 21/60* | (2013.01) | |
| *G06F 21/62* | (2013.01) | |
| *H04L 29/06* | (2006.01) | |
| *G06K 9/00* | (2006.01) | |

(52) U.S. Cl.
CPC ...... *G06K 9/00892* (2013.01); *H04L 63/0861* (2013.01); *G06F 2221/2139* (2013.01)

(58) Field of Classification Search
USPC ............................................................ 726/28
See application file for complete search history.

(56) References Cited

U.S. PATENT DOCUMENTS

| | | | |
|---|---|---|---|
| 7,698,745 B2* | 4/2010 | Pauker | H04L 63/0442 713/165 |
| 8,336,766 B1 | 12/2012 | Miller et al. | |
| 8,600,120 B2 | 12/2013 | Gonion et al. | |
| 2002/0019852 A1* | 2/2002 | Bahar | H04L 51/30 709/206 |
| 2002/0116508 A1* | 8/2002 | Khan | H04L 51/24 709/229 |
| 2003/0135740 A1* | 7/2003 | Talmor | G06F 21/32 713/186 |
| 2003/0214535 A1* | 11/2003 | Hymel | H04M 1/72547 715/814 |
| 2006/0282466 A1* | 12/2006 | Yasukaga | G06F 21/606 |
| 2010/0014720 A1* | 1/2010 | Hoyos | G06K 9/00107 382/118 |
| 2010/0205667 A1* | 8/2010 | Anderson | G06F 3/013 726/19 |
| 2014/0085191 A1* | 3/2014 | Gonion | G06F 1/3231 345/156 |
| 2014/0198958 A1 | 7/2014 | Nathan et al. | |
| 2014/0201844 A1* | 7/2014 | Buck | G06F 21/50 726/26 |
| 2014/0351163 A1* | 11/2014 | Tussy | G06Q 10/083 705/330 |
| 2014/0372301 A1* | 12/2014 | Anamanamuri | G06Q 20/4014 705/44 |
| 2015/0033017 A1* | 1/2015 | Uliyar | H04L 9/3231 713/171 |
| 2015/0254447 A1* | 9/2015 | Leuthardt | H04W 4/21 705/14.67 |

OTHER PUBLICATIONS

Keerthana Chintapudi; Online Signature Verification for Secure Transactions; International Journal of Scientific Engineering and Technology Research vol. 04, IssueNo. 35, Aug. 2015, pp. 7283-7286.

Google Scholar Search; Shoulder Surfing Prevention; available at http://scholar.google.com/scholar?hl=en&as_sdt=0,47&q=shoulder+surfing+prevention [last visited Jun. 26, 2017 9:59:33 AM].

* cited by examiner

MESSAGE SENDER SECURITY IN MESSAGING SYSTEM

CROSS-REFERENCE TO RELATED APPLICATION(S)

This application claims the benefit of U.S. patent application Ser. No. 14/643,800, entitled "MESSAGE SENDER SECURITY IN MESSAGING SYSTEM," which was filed Mar. 10, 2015 and was issued at U.S. Pat. No. 9,817,960 on Nov. 14, 2017, which claimed priority to U.S. Provisional Patent Application No. 61/950,423, entitled "BIOMETRIC FOR MOBILE ACCESS," which was filed on Mar. 10, 2014; U.S. Provisional Patent Application No. 61/985,059, entitled "USE OF BIOMETRIC FOR ACCESS TO DATA DEVICE AND ASSOCIATED SOLUTIONS FOR DIFFICULT BIOMETRIC READING SCENARIOS," which was filed on Apr. 28, 2014; and U.S. Provisional Patent Application No. 62/042,561, entitled "MESSAGE SENDER SECURITY IN MESSAGING SYSTEM," which was filed on Aug. 27, 2014; which are all incorporated by reference herein in their entireties.

RELATED FIELD

At least one embodiment of this disclosure relates generally to an electronic messaging system, and in particular to privacy and security of an electronic messaging system.

BACKGROUND

With the wide availability of mobile devices, in some areas/cultures, electronic messaging is becoming an integral part of a person's life. Because of this, privacy and security concerns arise over the use of such systems. Conventional technology protects against privacy violations by providing a screen lock on a mobile device whenever the mobile device is not used. An authorized user can unlock the screen by typing in a passcode into the mobile device. However, the passcode is knowledge that is transferable, and hence may be stolen. Furthermore, the screen lock prevents access to other applications on the mobile device, making it unnecessarily inconvenient. Other solutions protects against violation by scheduling the destruction of a message to ensure that content therein does not survive indefinitely.

Figure 1A:
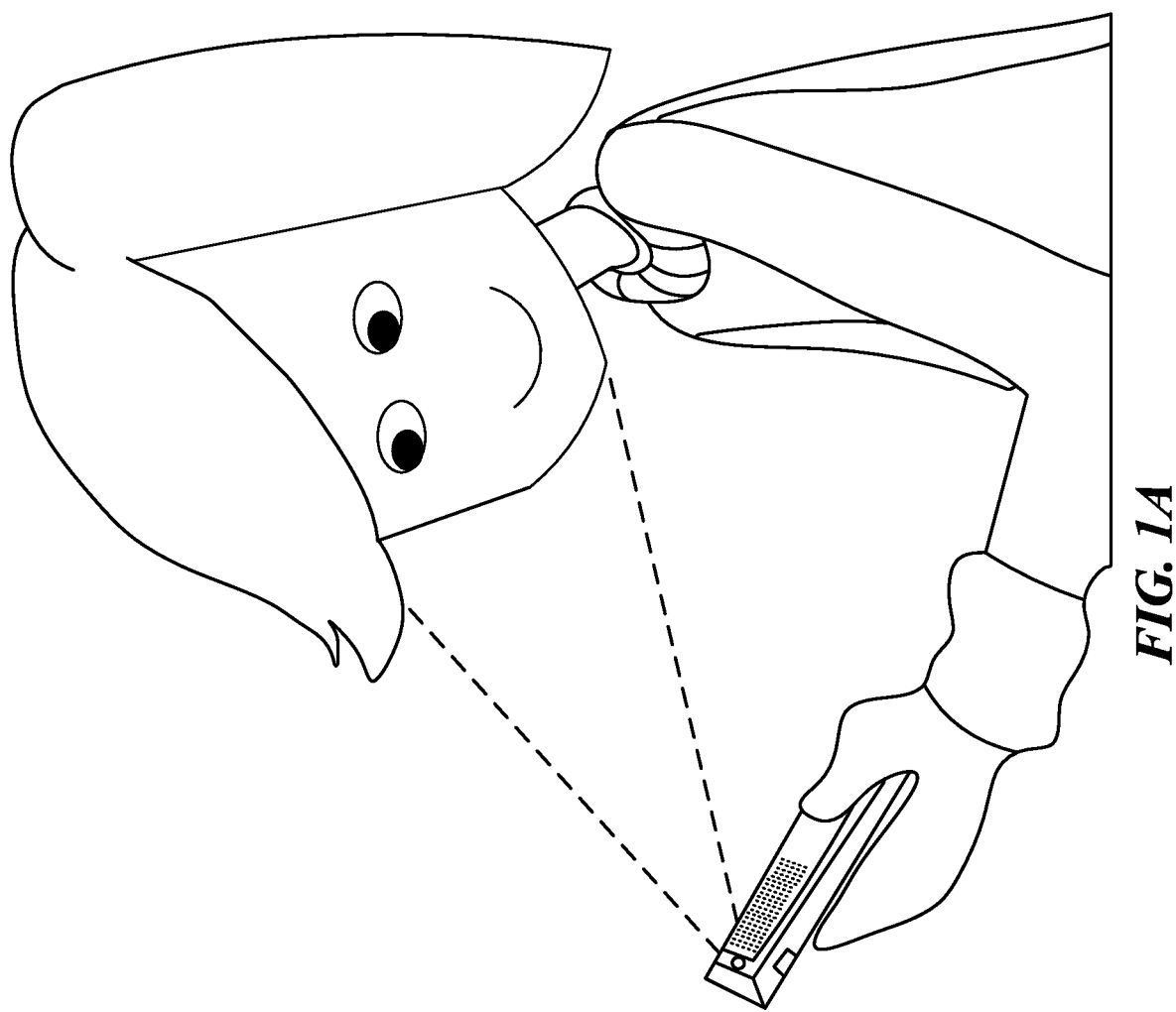
FIG. 1A is a diagram illustrating a messaging application of a mobile device revealing content of a message when a facial profile associated with a recipient account is recognized, in accordance with various embodiments.

The figures depict various embodiments of this disclosure for purposes of illustration only. One skilled in the art will readily recognize from the following discussion that alternative embodiments of the structures and methods illustrated herein may be employed without departing from the principles of the invention described herein.

DETAILED DESCRIPTION

Several embodiments pertain to protecting messages through a messaging system having a biometric security mechanism. The messaging system includes a message server system comprising one or more computer servers and messaging applications running on end-user devices. The end-user devices, for example, can include a desktop computer, a smart phone, a tablet, a wearable device, a gaming console, a smart TV, other electronic gadget, or any combination thereof. The messaging applications act as independent agents for the messaging system. For example, a messaging application may be installed on a general-purpose operating system (e.g., Windows, android, iOS, etc.). The messaging application can also be implemented by client-side script (e.g., JavaScript or Flash™) that may be executed on a web browser of the end-user devices.

The biometric security mechanism can be implemented via the messaging application. Unlike the conventional security mechanism that only protects privacy of the user of the recipient user device, the disclosed biometric security mechanism also protects the privacy and security of the sender of the message. This enables a new paradigm of protection for stakeholders (e.g., the message senders), who are conventionally hopelessly dependent on the message recipients to protect their interests.

The biometric security mechanism implements a biometric recognition process to verify one or more identities as authorized by the message senders. For example, the biometric recognition process may be based on facial recognition, ear recognition, silhouette recognition, speaker recognition, fingerprint recognition, device motion pattern recognition, tactile contact pattern recognition, etc. The biometric security mechanism can detect biometric patterns utilizing a sensor, such as a camera, a microphone, an accelerometer, a touch sensor, a gyroscope, other inertial sensor(s), other optical or radiofrequency (RF) sensor(s,) etc. In some embodiments, the biometric patterns are matched against one or more profile models authorized by the message sender. In some embodiments, the biometric security mechanism can profile the biometric patterns of one or more users into one or more profile models utilizing machine learning algorithms, such as support vector machines, Gaussian mixture models, hidden Markov models, etc. This profiling can occur passively during the registration of a messaging system account and/or thereafter when the messaging system account is engaged with the messaging application. Based on the profiles of the users, the biometric security mechanism can recognize a user in realtime by matching the biometric pattern detected by a sensor through the profile model.

The biometric security mechanism is instantiated whenever the messaging interface of the message application is actively opened and running on an end-user device. The biometric security mechanism utilizes one or more types of biometric recognition processes to determine whether the people who have access to the end-user device (e.g., looking at the screen of the end-user device) are consistent with the privacy settings of the sender account and the recipient account.

To use the messaging application on a user device, a user may have to identify a messaging system account associated with the messaging system. The biometric security mechanism uses the one or more types of biometric recognition processes to ensure that an operator using the messaging application matches a biometric profile associated with the messaging system account. This procedure ensures that a third party (e.g., a brother or a classmate) cannot send messages on behalf of the user. In the case that there are multiple operators for the same end-user device, this procedure also ensures that independent private sessions of using the messaging application can be established based on automatic biometric recognition. That is, even with a recipient's permission, a message is protecting against unauthorized sharing when a detected viewer is not authorized (e.g., not recognized with respect to known profile models or the recognized profile is not authorized) according to a message sender's permission setting.

The biometric security mechanism can provide customizable privacy shields per message or conversation. These privacy shields may be customized by privacy settings dictated by the sender of the message or the initiator of the conversation. The biometric security mechanism can use the one or more types of biometric recognition processes to ensure that the operator using the messaging application matches an authorized biometric profile in accordance with a privacy setting of an individual conversation or message. For example, the default privacy setting may be that the message or conversation is revealed when a biometric profile of the recipient account is recognized by the biometric security mechanism. In another example, the default privacy setting may be that the message or conversation is revealed when only the biometric profile of the recipient account is recognized without the presence of other detected human beings in the proximate area of the recipient end-user device.

In some embodiments, the privacy setting can indicate a single authorized account or biometric profile. In some embodiments, the privacy setting can indicate a group of authorized accounts or biometric profiles. In some embodiments, the privacy setting can indicate an attribute of a biometric profile, such as age, gender, facial gesture, facial expression, vocal pitch, etc. The attribute can be the sole variable to authorize a person. For example, the privacy setting can indicate that any female face (e.g., in the case of facial recognition) or any female voice (e.g., in the case of speaker recognition) would be authorized. The attribute can be an additional conditional on top of a specific account or biometric profile. For example, a sender account (e.g., John) may send a message with a privacy setting indicating Nancy as the recipient account. In some cases, the privacy setting can add an attribute of the recipient profile being female.

The privacy shield may be implemented, for example, as a screen lock, a scrambling of the message content, a blur of the message content, a blackout of the message content, an alert being sent to the message sender and/or the message recipient, capturing of a photograph of an offender detected by the biometric security mechanism, or any combination thereof. In some embodiments, the biometric security mechanism continuously loops through the one or more types of biometric recognition processes. In some embodiments, the biometric security mechanism disengages the privacy shield whenever an authorized biometric profile is recognized and detected. In some embodiments, the biometric security mechanism engages the privacy shield whenever a non-authorized biometric profile is detected.

A sender account or a recipient account can be associated with a single individual or a group of individuals. In the case of a group of individuals, biometric profiles of every member are associated with the sender account or the recipient account.

Failsafe Scenarios

In various embodiments, the biometric security mechanism may depend on at least a biometric recognition process. However, there may be scenarios where the biometric recognition process is inaccurate, inconsistent, unavailable, irrelevant, or any combination thereof. Under those scenarios, the biometric security mechanism may deploy at least an alternative biometric recognition process or an alternative method of authentication (e.g., passcode-based authentication or token-possession-based authentication). For example, unavailability of the biometric recognition process may be due to a sensor malfunction, a sensor being blocked, a hardware or software driver of the sensor malfunctioning, or any combination thereof. For example, the biometric recognition process may determine that the results of its biometric profile recognition are irrelevant because the end-user device is inside a pocket, because the end-user device is not facing an operator, or because the operator is determined to be driving (e.g., the location of the end-user device is moving rapidly beyond a threshold or the end-user device is accelerating beyond a threshold).

In some embodiments, the biometric recognition process can include an error checking process. The error checking process can determine whether or not the sensor or the driver of the sensor is returning measurements consistent with past history, specification, and/or otherwise consistent. The biometric recognition process can determine whether it is inaccurate or inconsistent based on the results of that error checking.

In some embodiments, the biometric security mechanism can supplement the biometric recognition process with additional authentication data. For example, the biometric security mechanism can monitor motion of the end-user device using a motion sensor. Whenever the motion indicates that an orientation of the end-user device is changing, the privacy shield is activated to protect content of a message. This is advantageous to prevent the recipient user to show the content of the message to another person against the sender's permission settings.

In some embodiments, even when a message is received by a recipient user who is validated via the biometric recognition process, a privacy shield can still disable/hide the message if the end-user device (e.g., a smart phone) swivels in either direction from a presumed location of the validated recipient user. This is advantageous because, by swiveling the end-user device, the end-user device is likely losing contact with the validated recipient user or a display of the end-user device is being redirected to another. As such, the content of the message is no longer secure from the perspective of the sender.

One or more accelerometers or motion sensors can be part of the biometric security mechanism to supplement the biometric recognition process. The motion data can ensure the safety of the sender's content. For example, a combination of facial recognition with accelerometer data provides a double layer security to protect the content of a message from the sender's perspective.

Alternative Embodiments

The disclosure above pertains to the specific example of an electronic messaging system for delivery of text, images, audio clips, or video clips. However, it is within the contemplation of this disclosure to implement the biometric security mechanism to other similar systems that includes registration of a sender account and the receiver account. For example, the biometric security mechanism can apply to email, social network, dating network, event/meet up invitation, physical delivery of goods, enterprise messaging (e.g., financial agent to customer messaging, real estate agent to customer messaging, medical professional messaging, etc.), or any combination thereof. The biometric security mechanism is advantageous in enforcing privacy setting of the sender at the device of the recipient. This is an improvement over existing technology that only seeks to protect against unauthorized exposure of content on behalf of the device owner but not on behalf of the sender.

The biometric security mechanism is also advantageous in preventing impersonation attempts, such as for the purpose of cyber bullying, by verifying the identity of a message sender when composing a message. This improves the overall accountability of messaging within the messaging system. Similarly, in an enterprise environment, the authentication in both viewing and composition of the message enhances enterprise-level security and compliance (e.g., such as eHealth compliance when the message content involves medical information).

The disclosure above assumes that the messaging application implements both the biometric security mechanism and a messaging interface (e.g., to compose and read messages). However, it is within the contemplation of this disclosure to implement the biometric security mechanism on a separate device or application from where the messaging interface is implemented. For example, in the case of an enterprise email system, an email access interface may be provided on a desktop computer while the biometric security mechanism may be implemented on a mobile device (e.g., a smart phone). In this example, the biometric security mechanism can require the mobile device to connect with the email access interface on the desktop computer. The biometric security mechanism can perform the biometric recognition process to verify that there is a secure environment near the desktop computer (e.g., no unauthorized user around and/or an authorized user is present). In response to verifying a secure environment, the biometric security mechanism can notify the email access interface to reveal content of a message.

Figure 1B:
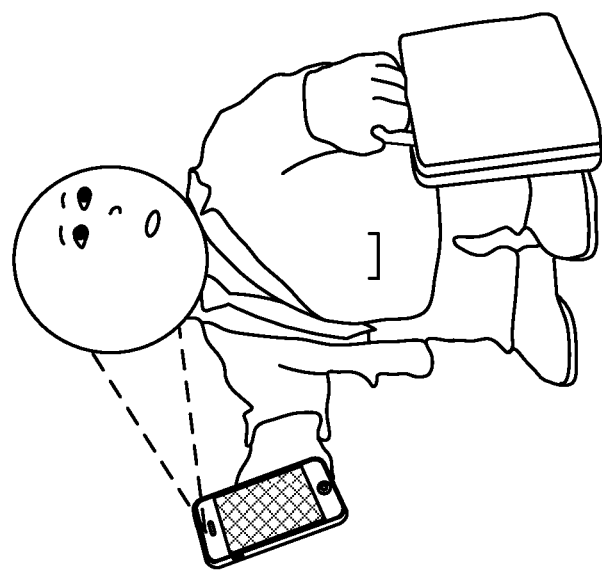
FIG. 1B is a diagram illustrating a messaging application of a mobile device hiding content of a message when a facial profile associated with a recipient account is not detected, in accordance with various embodiments.
Figure 1C:
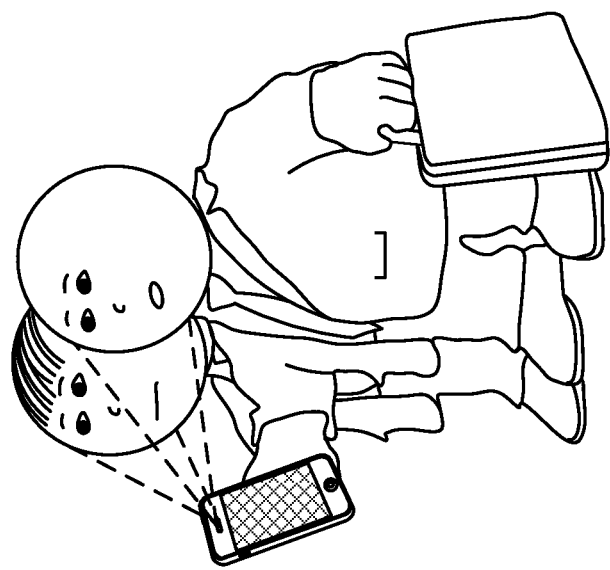
FIG. 1C is a diagram illustrating a messaging application of a mobile device hiding content of a message when a facial profile associated with a recipient account is detected and a second unauthorized facial profile is detected, in accordance with various embodiments.

FIGS. 1A through 1C illustrate an example of the biometric security mechanism that implements a facial recognition process to protect the privacy of both a sender of a message and a recipient of the message. FIG. 1A is a diagram illustrating a messaging application of a mobile device revealing content of a message when a facial profile associated with a recipient account is recognized, in accordance with various embodiments. FIG. 1B is a diagram illustrating a messaging application of a mobile device hiding content of a message when a facial profile associated with a recipient account is not detected, in accordance with various embodiments. FIG. 1C is a diagram illustrating a messaging application of a mobile device hiding content of a message when a facial profile associated with a recipient account is detected and a second unauthorized facial profile is detected, in accordance with various embodiments.

Figure 2:
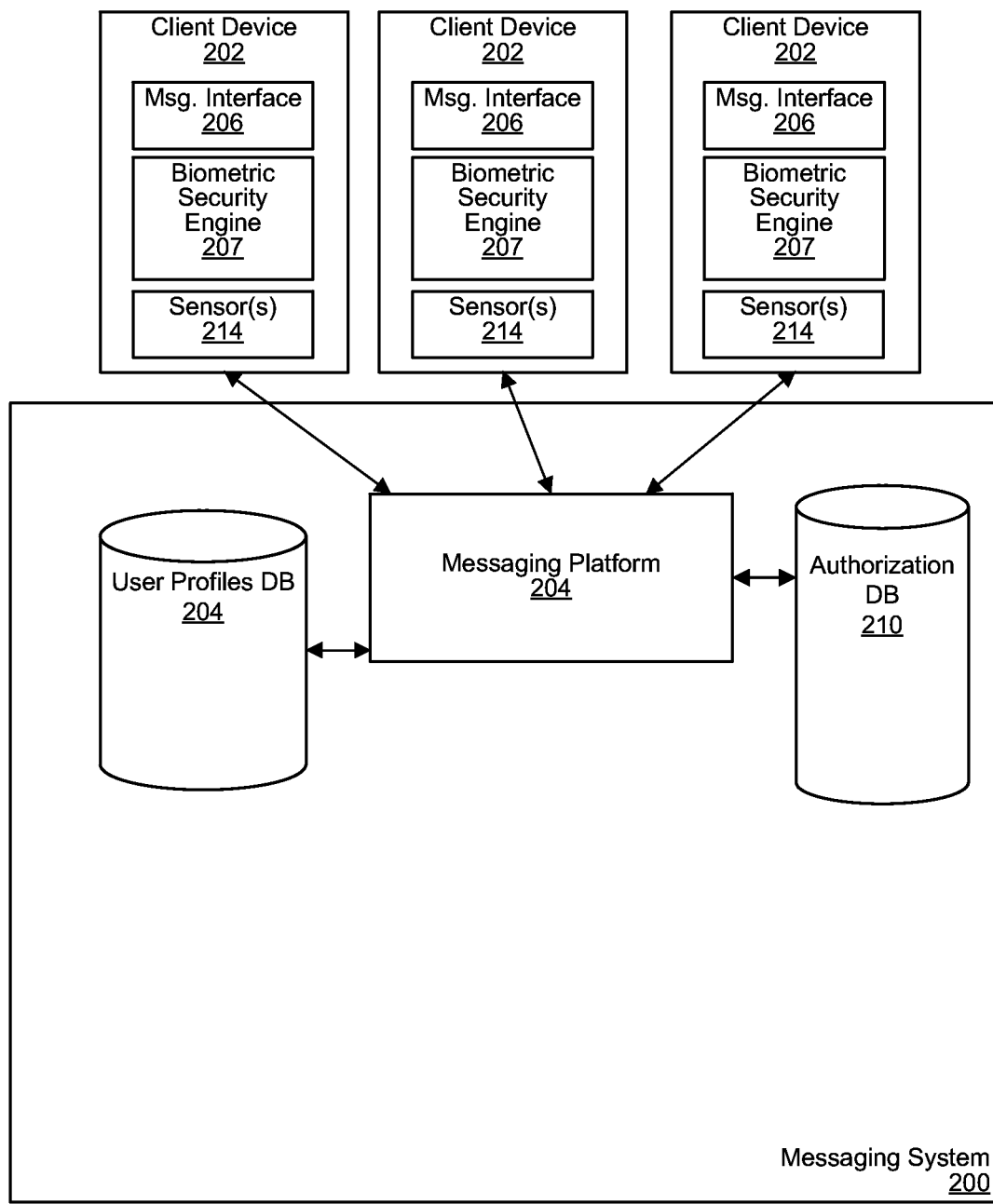
FIG. 2 is a block diagram of a system environment of a messaging system implementing a biometric security mechanism, in accordance with various embodiments.

FIG. 2 is a block diagram of a system environment of a messaging system 200 implementing a biometric security mechanism, in accordance with various embodiments. The messaging system 200 can communicate with client devices 202 (e.g., mobile phones, tablets, desktop computers, laptops, other network-enabled devices, or any combination thereof). The messaging system 200 can include a messaging platform 204 (e.g., one or more computer servers) configured to provide a service to facilitate human understandable electronic communication between user accounts. The human understandable electronic communication can include emoticons, text, photos, audio clips, videos, links, images, or any combination thereof. The human understandable content of the electronic communication may be part of an electronic message or can be referenced in the electronic message (e.g., stored elsewhere that is accessible through a network).

In some embodiments, each of the client devices 202 can have an instance of a messaging interface 206 and a biometric security engine 207 running thereon that communicates with the messaging platform 204. In some embodiments, the messaging interface 206 and the biometric security engine 207 are part of a messaging application running and/or installed on the client device. In some embodiments, the messaging interface 206 is installed and/or running on a first client device and the biometric security engine 207 is install and/or running on a second client device. In these embodiments, the biometric security engine 207 on the second client device can control a privacy shield implemented by the messaging interface 206.

For example, the messaging interface 206 and/or the biometric security engine 207 can be embodied as a mobile application running on operating systems of some of the client devices 202. In another example, the messaging interface 206 and/or the biometric security engine 207 can be implemented as a web-based application running on web browsers on some of the client devices 202.

The client devices 202 can be associated with user accounts. In some embodiments, a user account of the messaging system 200 can have multiple client devices associated therewith. In some embodiments, a client device can have multiple user accounts associated therewith. Conversations between user accounts are tracked by the messaging system 200 such that the messaging system 200 can deliver an electronic message from a client device of one user account to a client device of another user account.

In some embodiments, the messaging system 200 can include a user profile database 208. The user profile database 208 is configured to store user profiles of one or more user accounts. The user profiles may be associated with one or more social networking systems (e.g., an affiliated social networking system, a social networking system integrated with the messaging system 200, or an external social networking system) and social network profiles in the social networking systems.

In various embodiments, the messaging interface 206 can implement a privacy shield. The biometric security engine 207, for example, can recognize whether or not an authorized user is present by analyzing a video feed from its respective client device using a facial recognition algorithm. The messaging platform 204 can maintain biometric profiles of user accounts in the user profile database 208. The messaging platform 204 associates a sender account and a receiver account with every message (e.g., as specified by the sender account). The biometric profiles of the sender account and the receiver account can be both considered "authorized users." One or more lists of authorized users may be stored in an authorization database 210. The authorization database 210 can also maintain one or more lists of blacklisted user accounts that are explicitly unauthorized. In some embodiments, the sender account, the receiver account, or both can add additional user accounts into the list of authorized users. In some embodiments, the sender account, the receiver account, or both can add one or more user accounts into the list of "blacklisted" user accounts.

The authorization database 210 can store a list of authorized user specific to a message conversation or specific to a user account (e.g., specific to a sender account, a receiver account, or both). For example, for each message or a conversation sent or each message or conversation received, a user can add or remove one or more accounts from the list of authorized users or blacklisted users. For another example, a first user account can add a second user account as an authorized user (e.g., a spouse) or a blacklisted user (e.g., a rival friend or sibling) for all conversations that the first user account participates in. In some embodiments, e.g., as required by law, the authorization database 210 can also store a list of globally authorized users.

The messaging platform 204 can communicate with the biometric security engine 207 to secure content of messages. For example, the messaging platform 204 can send biometric profiles (e.g., facial profiles) of the authorized users and/or expressly unauthorized users to be verified on a client device by the biometric security engine 207. The biometric security engine 207 can monitor outputs of a sensor 214 (e.g., a camera) to detect and recognize biometric profiles. In some embodiments, the messaging platform 204 can request the biometric security engine 207 to capture and send an image or a video of its operator to be verified on the messaging platform 204. In those embodiments, the messaging platform 204 returns the result of the verification back to the biometric security engine 207.

Once the biometric security engine 207 determines that a secure environment is present, the biometric security engine 207 can control the privacy shield implemented in the messaging interface 206 to either reveal or hide content of a message. The privacy shield implemented by the messaging interface 206 can reveal content of a message conversation when the authorized user is detected. In some embodiments, the privacy shield can hide the content in response to detecting both an authorized user and an unauthorized user (e.g., implicitly unauthorized or expressly unauthorized). In some embodiments, the privacy shield can hide the content whenever an expressly unauthorized user account is detected.

Functional components (e.g., engines, modules, and databases) associated with the messaging system 200 can be implemented as circuitry, firmware, software, or other functional instructions. For example, the functional components can be implemented in the form of special-purpose circuitry, in the form of one or more appropriately programmed processors, a single board chip, a field programmable gate array, a network-capable computing device, a virtual machine, a cloud computing environment, or any combination thereof. For example, the functional components described can be implemented as instructions on a tangible storage memory capable of being executed by a processor or other integrated circuit chip. The tangible storage memory may be volatile or non-volatile memory. In some embodiments, the volatile memory may be considered "non-transitory" in the sense that it is not a transitory signal. Memory space and storages described in the figures can be implemented with the tangible storage memory as well, including volatile or non-volatile memory.

Each of the functional components may operate individually and independently of other functional components. Some or all of the functional components may be executed on the same host device or on separate devices. The separate devices can be coupled through one or more communication channels (e.g., wireless or wired channel) to coordinate their operations. Some or all of the functional components may be combined as one component. A single functional component may be divided into sub-components, each sub-component performing separate method step or method steps of the single component.

In some embodiments, at least some of the functional components share access to a memory space. For example, one functional component may access data accessed by or transformed by another functional component. The functional components may be considered "coupled" to one another if they share a physical connection or a virtual connection, directly or indirectly, allowing data accessed or modified by one functional component to be accessed in another functional component. In some embodiments, at least some of the functional components can be upgraded or modified remotely (e.g., by reconfiguring executable instructions that implements a portion of the functional components). The systems, engines, or devices described may include additional, fewer, or different functional components for various applications.

Figure 3A:
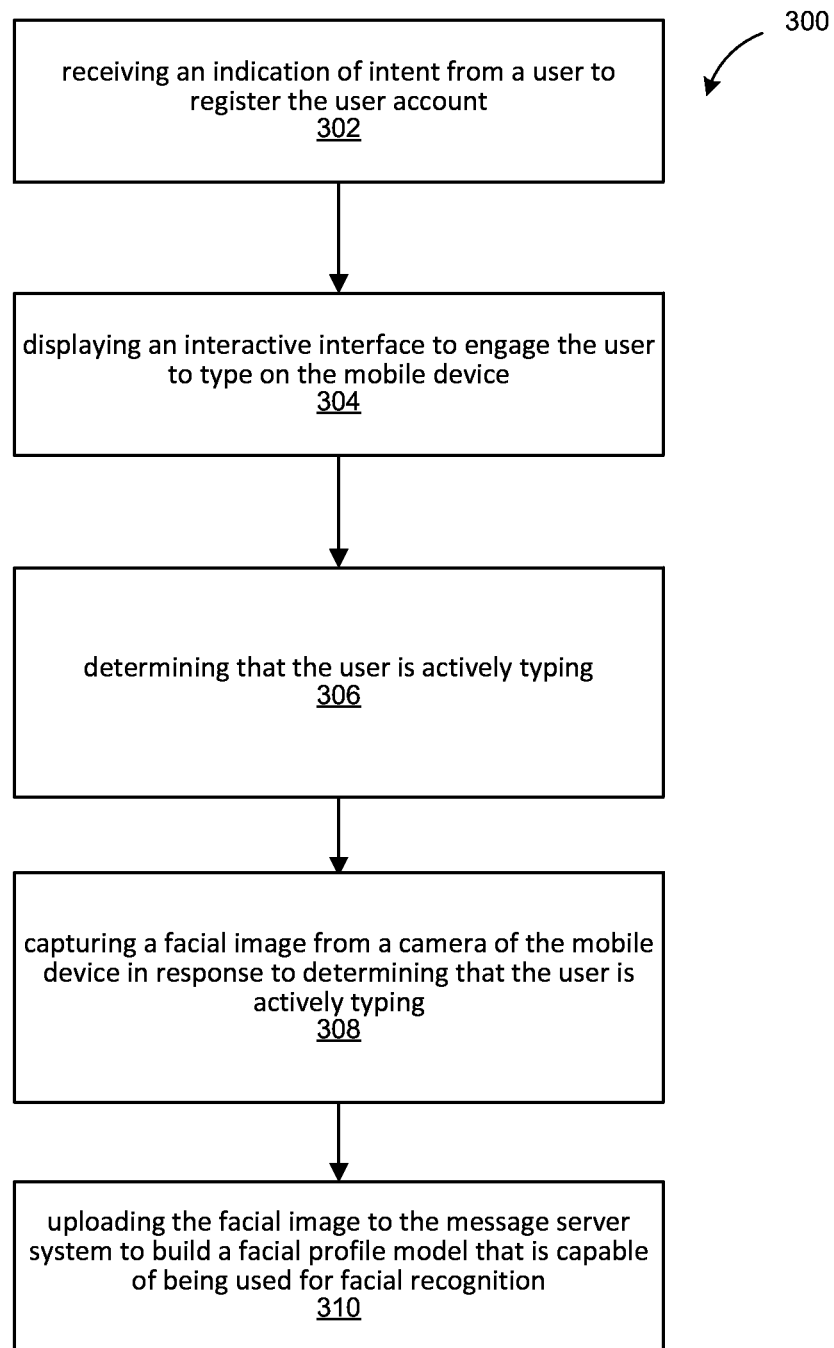
FIG. 3A is a flow chart of a method of operating a messaging application on a mobile device to register a user account on a messaging server system, in accordance with various embodiments.

FIG. 3A is a flow chart of a method 300 of operating a messaging application (e.g., the messaging interface 206 or the biometric security engine 207 of FIG. 2) on a mobile device (e.g., one of the client devices 202 of FIG. 2) to register a user account on a messaging server system (e.g., the messaging system 200 of FIG. 2), in accordance with various embodiments. The method 300 can include the messaging application receiving an indication of intent from a user to register the user account in step 302. In step 304, the messaging application displays an interactive interface to engage the user to type on the mobile device. In step 306, the messaging application determines that the user is actively typing. In step 308, the messaging application captures a facial image from a camera of the mobile device in response to determining that the user is actively typing. In step 310, the messaging application uploads the facial image to the message server system to build a facial profile model that is capable of being used for facial recognition.

Figure 3B:
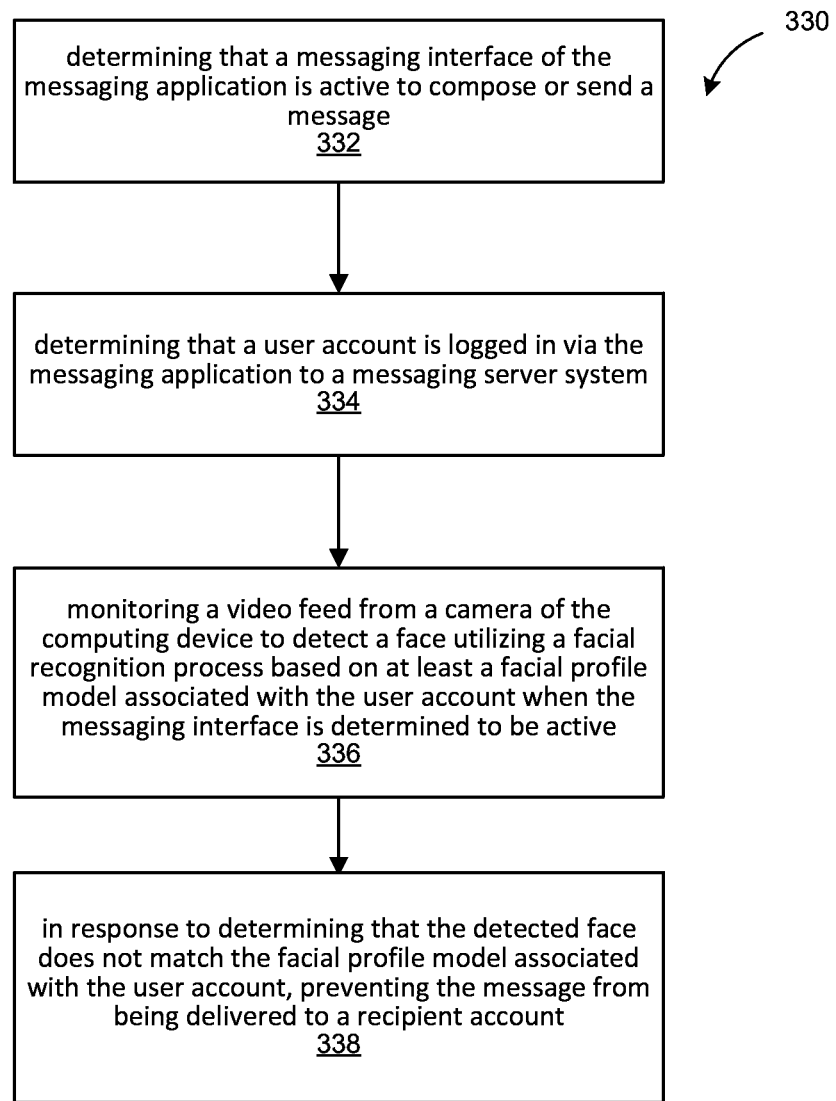
FIG. 3B is a flow chart of a method of operating a messaging application on a computing device to send a message, in accordance with various embodiments.

FIG. 3B is a flow chart of a method 330 of operating a messaging application (e.g., the messaging interface 206 or the biometric security engine 207 of FIG. 2) on a computing device (e.g., one of the client devices 202 of FIG. 2) to send a message, in accordance with various embodiments. The method 330 can include step 332 of the messaging application determining that a messaging interface of the messaging application is active to compose or send a message. Then in step 334, the messaging application determines that a user account is logged in via the messaging application to a messaging server system. In step 336, the messaging application monitors a video feed from a camera of the computing device to detect a face utilizing a facial recognition process based on at least a facial profile model associated with the user account when the messaging interface is determined to be active. In step 338, in response to determining that the detected face does not match the facial profile model associated with the user account, the messaging application prevents the message from being delivered to a recipient account.

In some embodiments, the method 330 can further include enabling the message to be delivered to the recipient account in response to determining that the detected face matches the facial profile model associated with the user account. In some embodiments, the method 330 can further include capturing an image via the camera while the messaging interface is active; and providing the image to the message server system to forward to a recipient device associated with the recipient account.

Figure 3C:
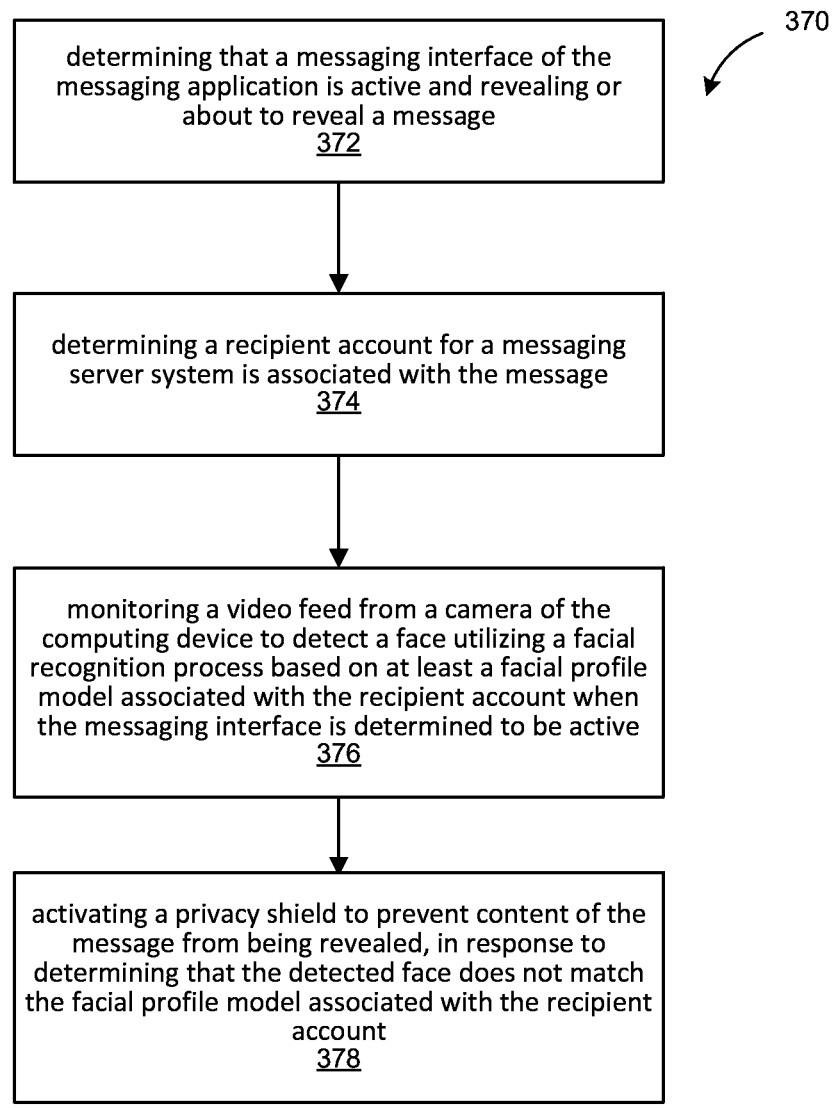
FIG. 3C is a flow chart of a method of operating a messaging application on a computing device to access a message, in accordance with various embodiments.

FIG. 3C is a flow chart of a method 370 of operating a messaging application (e.g., the messaging interface 206 or the biometric security engine 207 of FIG. 2) on a computing device (one of the client devices 202 of FIG. 2) to access a message, in accordance with various embodiments. The method 370 can include the messaging application determining that a messaging interface of the messaging application is active and revealing or about to reveal a message in step 372. In step 374, the messaging application determines a recipient account for a messaging server system is associated with the message. In step 376, the messaging application monitors a video feed from a camera of the computing device to detect a face utilizing a facial recognition process based on at least a facial profile model associated with the recipient account when the messaging interface is determined to be active. In step 378, the messaging application activates a privacy shield to prevent content of the message from being revealed, in response to determining that the detected face does not match the facial profile model associated with the recipient account.

In some embodiments, step 376 includes performing the facial recognition process in accordance with a cyclic schedule while the messaging interface is active. In some embodiments, step 378 includes detecting two or more faces and step 378 includes activating the privacy shield when one of the detected faces matches the recipient account.

In some embodiments, the method 370 can further comprise: gathering motion data from a sensor in the computing device; determining whether a display of the computing device showing the messaging interface is changing orientation; and, in response to determining that the display is changing orientation, activating the privacy shield. In some embodiments, the recipient account is indicated per message or per conversation.

In some embodiments, the method 370 can further comprise: determining whether the facial recognition process is inaccurate, inconsistent, unavailable, irrelevant, or any combination thereof; and, in response to determining that the facial recognition process is inaccurate, inconsistent, unavailable, irrelevant, or any combination thereof, performing an alternative biometric recognition process to verify presence of the recipient account. For example, the alternative biometric recognition process can include ear recognition, speaker recognition, tactile contact recognition, motion pattern recognition, or any combination thereof.

In some embodiments, step 376 includes performing the facial recognition process against facial profile models associated with an external database. For example, the external database can be a criminal database, sexual predictor database, missing person database, amber alert database, medical database, legal compliance-related database, or any combination thereof.

While processes or methods are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. In addition, while processes or blocks are at times shown as being performed in series, these processes or blocks may instead be performed in parallel, or may be performed at different times.

Figure 4:
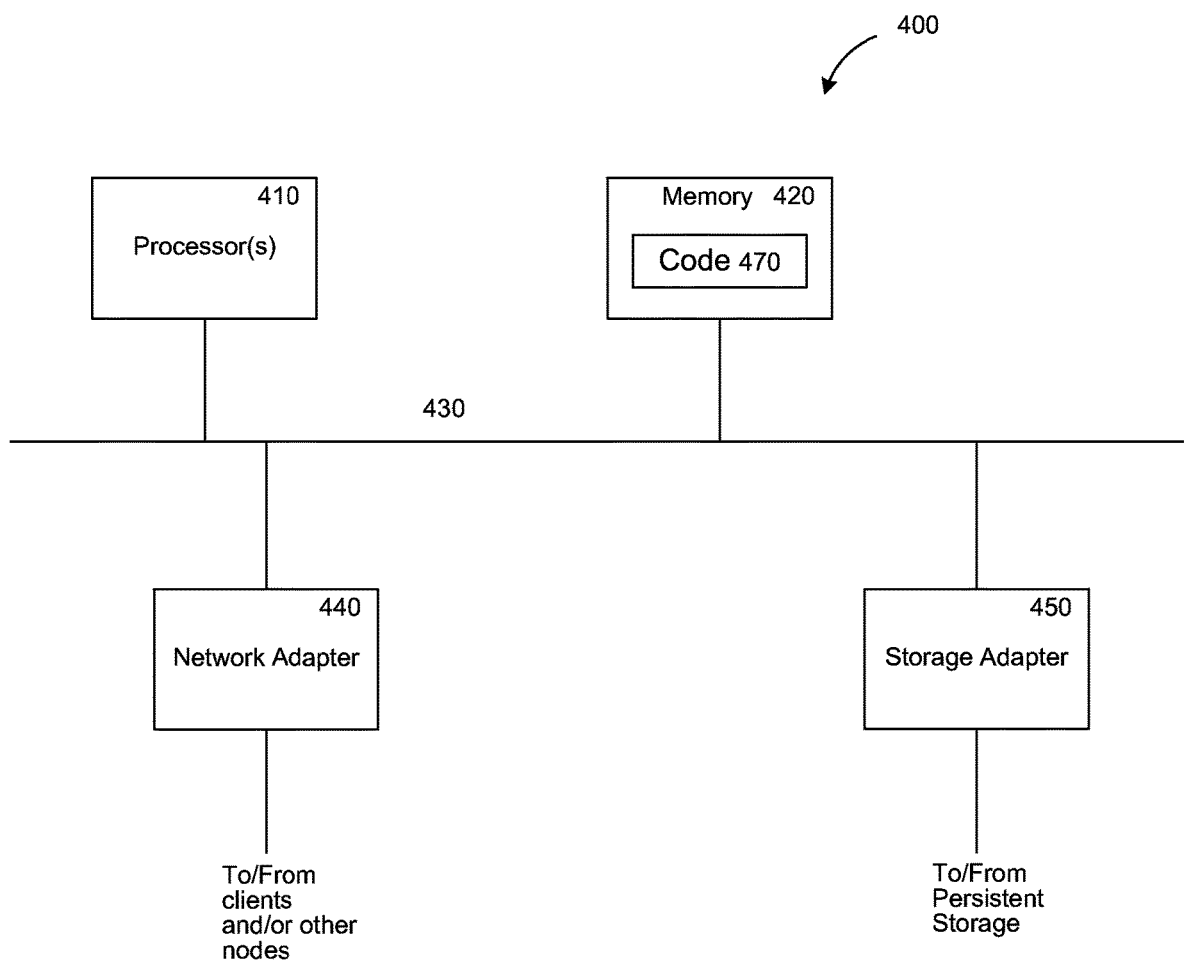
FIG. 4 is a block diagram of an example of a computing device, which may represent one or more computing device or server described herein, in accordance with various embodiments.

FIG. 4 is a block diagram of an example of a computing device 400, which may represent one or more computing device or server described herein, in accordance with various embodiments. The computing device 400 can be one or more computing devices that implement the messaging system 200 of FIG. 2 or methods and processes described in this disclosure. The computing device 400 includes one or more processors 410 and memory 420 coupled to an interconnect 430. The interconnect 430 shown in FIG. 4 is an abstraction that represents any one or more separate physical buses, point-to-point connections, or both connected by appropriate bridges, adapters, or controllers. The interconnect 430, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1494 bus, also called "Firewire".

The processor(s) 410 is/are the central processing unit (CPU) of the computing device 400 and thus controls the overall operation of the computing device 400. In certain embodiments, the processor(s) 410 accomplishes this by executing software or firmware stored in memory 420. The processor(s) 410 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 420 is or includes the main memory of the computing device 400. The memory 420 represents any form of random access memory (RAM), read-only memory (ROM), flash memory, or the like, or a combination of such devices. In use, the memory 420 may contain a code 470 containing instructions according to the mesh connection system disclosed herein.

Also connected to the processor(s) 410 through the interconnect 430 are a network adapter 440 and a storage adapter 450. The network adapter 440 provides the computing device 400 with the ability to communicate with remote devices, over a network and may be, for example, an Ethernet adapter or Fibre Channel adapter. The network adapter 440 may also provide the computing device 400 with the ability to communicate with other computers. The storage adapter 450 enables the computing device 400 to access a persistent storage, and may be, for example, a Fibre Channel adapter or SCSI adapter.

The code 470 stored in memory 420 may be implemented as software and/or firmware to program the processor(s) 410 to carry out actions described above. In certain embodiments, such software or firmware may be initially provided to the computing device 400 by downloading it from a remote system through the computing device 400 (e.g., via network adapter 440).

The techniques introduced herein can be implemented by, for example, programmable circuitry (e.g., one or more microprocessors) programmed with software and/or firmware, or entirely in special-purpose hardwired circuitry, or in a combination of such forms. Special-purpose hardwired circuitry may be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable storage medium," as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-recordable media (e.g., read-only memory (ROM); random access memory (RAM); magnetic disk storage media; optical storage media; flash memory devices; etc.), etc.

The term "logic," as used herein, can include, for example, programmable circuitry programmed with specific software and/or firmware, special-purpose hardwired circuitry, or a combination thereof.

Some embodiments of the disclosure have other aspects, elements, features, and steps in addition to or in place of what is described above. These potential additions and replacements are described throughout the rest of the specification. For example, some embodiments include a computer-implemented method of operating a messaging application on a computing device to access an electronic message. The computer-implemented method can include the messaging application determining that a messaging interface of the computing device is active and is revealing or about to reveal the electronic message. The messaging application can identify a recipient account of a messaging server system that is associated with the electronic message according to the electronic message or the messaging server system. The messaging application can monitor a data feed (e.g., video feed) from a camera of the computing device to detect a biometric pattern (e.g., one or more facial features) that matches against a biometric profile model (e.g., a facial profile model) associated with the recipient account utilizing a biometric recognition process (e.g., a facial recognition process), when the messaging interface is determined to be active. In response to determining that the detected biometric pattern does not match the biometric profile model associated with the recipient account, the messaging application can activate a privacy shield to prevent content of the electronic message from being revealed. In some embodiments, the recipient account is indicated per message. In some embodiments, the conversing accounts are indicated in every conversation.

In some embodiments, the messaging application can receive the biometric profile model from the messaging server system. In some embodiments, the messaging server system can encrypt the biometric profile model prior to sending it to the messaging application. In some embodiments, when monitoring the video feed, the messaging application can also update the biometric profile model while the messaging interface is active and the detected biometric pattern is confirmed to be associated with the recipient account.

In some embodiments, the messaging application, when monitoring the data feed, can perform the biometric recognition process in accordance with a cyclic schedule while the messaging interface is active. In some embodiments, the messaging application, when monitoring the data feed, can detect two or more faces. In these embodiments, the messaging application can activate the privacy shield when one of the detected faces matches the recipient account.

In some embodiments, the messaging application gathers motion data from a sensor in the computing device. The messaging application can determine whether a display of the computing device showing the messaging interface is changing orientation. In response to determining that the display is changing orientation, the messaging application can activate the privacy shield.

In some embodiments, the messaging application can determine whether the biometric recognition process is inaccurate, inconsistent, unavailable, irrelevant, or any combination thereof. In response to determining that the biometric recognition process is inaccurate, inconsistent, unavailable, irrelevant, or any combination thereof, the messaging application can perform an alternative biometric recognition process to verify presence of the recipient account. For example, the alternative biometric recognition process can include ear recognition, speaker recognition, tactile contact recognition, motion pattern recognition, or any combination thereof.

In some embodiments, when performing the biometric recognition process, the biometric pattern is compared against one or more biometric profile models. For example, the biometric profile models can be stored in the computing device. For another example, the biometric profile models can be stored in an external database (e.g., in the messaging server system). In some embodiments, the external database can be a criminal database, sexual predictor database, missing person database, amber alert database, medical database, legal compliance-related database, or any combination thereof.

Some embodiments a manufactured data storage apparatus comprising computer-executable instructions. The computer-executable instructions can include instructions for determining that a messaging interface of the messaging application is active to compose or send the electronic message; instructions for determining that a user account is logged in via the messaging application to a messaging server system; instructions for monitoring a video feed from a camera of the computing device to detect a face utilizing a facial recognition process based on at least a facial profile model associated with the user account when the messaging interface is determined to be active; and instructions for in response to determining that the detected face does not match the facial profile model associated with the user account, preventing the electronic message from being delivered to a recipient account. The computer-executable instructions can further include instructions for, in response to determining that the detected face matches the facial profile model associated with the user account, enabling the electronic message to be delivered to the recipient account. The computer-executable instructions can further include instructions for capturing an image via the camera while the messaging interface is active; and instructions for providing the image to the message server system to forward to a recipient device associated with the recipient account.

Some embodiments include a computer server. The computer server can include a processor and a memory apparatus storing executable instructions to implement a messaging platform when executed by the processor. The messaging platform can be configured to receive an electronic message from a first user account logged in from a first user device, wherein the electronic device is destined to a second user account; identify a second user device associated with the second user account; determine a permission setting for the electronic message according to security setting provided by the first user account, wherein the permission setting identifies a biometric profile model associated with the second user account; and provide the electronic message and the permission setting to a messaging application executed on the second user device to cause the messaging application to enforce a biometric security mechanism based on the biometric profile model identified by the permission setting. The messaging platform can be further configured to encrypt the biometric profile model and push the biometric profile model to the second user device. In some embodiments, the messaging platform is configured to register the second user account via the second user device prior to receiving the electronic message and wherein the messaging platform is configured to record one or more biometric patterns observed via a sensor of the second user device to build or update the biometric profile model.

Some embodiments include a computer-implemented method of operating a messaging application on a mobile device to register a user account on a messaging server system. The method can include the messaging application receiving an indication of intent from a user to register the user account; displaying an interactive interface to engage the user to type on the mobile device; determining that the user is actively typing; in response to determining that the user is actively typing, capturing a facial image from a camera of the mobile device; and uploading the facial image to the message server system to build a biometric profile model that is capable of being used for facial recognition.

What is claimed is:

1. A computer-implemented method of operating a messaging application, comprising:
   receiving, by a first mobile computer device associated with a sender, a sensor feed of the sender, wherein the sensor feed is a data feed of at least one sensor of the first mobile computer device associated with the sender;
   determining that the sensor feed matches a biometric profile associated with the sender;
   receiving, from a sender at a messaging interface of the first mobile computer device, an electronic message including an electronic content and a designated receiver set by the sender;
   subsequent to determining that the sensor feed matches the biometric profile associated with the sender, transmitting, to a second mobile computer device associated with the designated receiver, the electronic message, wherein the second mobile computer device has a generated associated biometric profile model for the designated receiver and is configured to:
      obscure the electronic content on the messaging interface upon detecting via a sensor feed of the second mobile computer device an alternate biometric pattern not matching biometric profile model for the designated receiver of the electronic message; and
      display the electronic content of the electronic message upon verifying a biometric pattern received by a sensor feed of at least one sensor of the second mobile computer device matches the biometric profile model for the designated receiver.

2. The computer-implemented method of claim 1, wherein the biometric profile is a facial profile model, wherein the biometric pattern includes one or more features of a facial image, and wherein the biometric profile model is a facial profile model.

3. The computer-implemented method of claim 1 further comprising monitoring the sensor feed of the at least one sensor of the first mobile computer device associated with the sender.

4. The computer-implemented method of claim 3, where in the second mobile computer device is further configured to:
   monitoring the sensor feed of the second mobile computer device;
   detecting more than one individual via the sensor feed; and
   obscuring the display of the second mobile computer device upon detecting more than one individual.

5. The computer-implemented method of claim 1 further comprising:
   receiving, from the sender, a plurality of designated receivers; and
   transmitting, to a plurality of receiver mobile computer devices corresponding to the plurality of designated receivers the electronic message, wherein each of the plurality of receiver mobile computer devices has a generated associated receiver biometric profile model for the corresponding designated receiver and is configured to:
      obscure the electronic content on the messaging interface upon detecting via a sensor feed of the receiver mobile computer device of the plurality of receiver mobile computer devices an alternate biometric pattern not matching the receiver biometric profile model for the designated receiver of the electronic message; and
      display the electronic content of the electronic message upon verifying a biometric pattern received by a sensor feed of at least one sensor of the receiver mobile computer device matches the receiver biometric profile model for the designated receiver of the electronic message.

6. At least one non-transitory computer-readable storage media having computer-executable instructions embodied thereon, wherein when executed by at least one processor in communication with at least one memory device, the computer-executable instructions cause the processor to:
   receive a sensor feed of a sender, wherein the sensor feed is a data feed of at least one sensor of a first mobile computer device associated with the sender;
   determine that the sensor feed matches a biometric profile associated with the sender;
   receive, from a sender at a messaging interface of the first mobile computer device, an electronic message including an electronic content and a designated receiver set by the sender;
   subsequent to determining that the sensor feed matches the biometric profile associated with the sender, transmit, to a second mobile computer device associated with the designated receiver, the electronic message, wherein the second mobile computer device has a generated associated biometric profile model for the designated receiver and includes computer-executable instructions that cause at least one processor associated with the second mobile computer device to:
      obscure the electronic content on the messaging interface upon detecting via a sensor feed of the second mobile computer device an alternate biometric pattern not matching biometric profile model for the designated receiver of the electronic message; and
      display the electronic content of the electronic message upon verifying a biometric pattern received by a sensor feed of at least one sensor of the second mobile computer device matches the biometric profile model for the designated receiver.

7. The at least one non-transitory computer-readable storage media of claim 6, wherein the biometric profile is a facial profile model, wherein the biometric pattern includes one or more features of a facial image, and wherein the biometric profile model is a facial profile model.

8. A messaging system comprising:
a first mobile messaging computer device associated with a first authorized user and having a first biometric profile associated with the first authorized user; and
a second mobile messaging computer device associated with a second authorized user and having a second biometric profile associated with the second authorized user,
wherein said first mobile messaging computer device is configured to:
receive a sensor feed of the first authorized user, wherein the sensor feed is a data feed of at least one sensor of the first mobile messaging computer device;
determine that the sensor feed matches the first biometric profile;
receive, from the first authorized user at a messaging interface of the first mobile messaging computer device, an electronic message including an electronic content and a designated receiver set by the first authorized user, wherein the designated receiver is the second authorized user; and
subsequent to determining that the sensor feed matches the first biometric profile, transmit, to the second mobile messaging computer device, the electronic message; and
wherein the second mobile messaging computer device is configured to:
obscure the electronic content on a messaging interface upon detecting via the sensor feed of the second mobile messaging computer device an alternate biometric pattern not matching the second biometric profile; and
display the electronic content of the electronic message upon verifying a biometric pattern received by a sensor feed of at least one sensor of the second mobile messaging computer device matches the second biometric profile.

9. The messaging system of claim 8, wherein the first biometric profile and the second biometric profile are facial profile models of the first authorized user and the second authorized user respectively, and wherein the biometric pattern includes one or more features of a facial image.

10. The messaging system of claim 8, where in the second mobile messaging computer device is further configured to:
monitor the sensor feed of the second mobile messaging computer device;
detect more than one individual via the sensor feed; and
obscure the display of the second mobile messaging computer device upon detecting more than one individual.

11. The messaging system of claim 8, wherein the first mobile messaging computer device is further configured to:
receive, from the sender first authorized user, a plurality of designated receivers; and
transmit, to a plurality of receiver mobile computer devices corresponding to the plurality of designated receivers the electronic message, wherein each of the plurality of receiver mobile computer devices has a generated associated receiver biometric profile model for the corresponding designated receiver.

12. At least one non-transitory computer-readable storage media having computer-executable instructions embodied thereon, wherein when executed by a first processor and a second processor, the computer-executable instructions cause the first processor to:
store a first biometric profile of a first authorized user;
receive a sensor feed of the first authorized user, wherein the sensor feed is a data feed of at least one sensor of a first mobile messaging computer device;
determine that the sensor feed matches the first biometric profile;
receive, from the first authorized user at a messaging interface, an electronic message including an electronic content and a designated receiver set by the first authorized user, wherein the designated receiver is a second authorized user; and
subsequent to determining that the sensor feed matches the first biometric profile, transmit, to a second mobile messaging computer device, the electronic message; and
wherein the computer-executable instructions cause the second processor to:
obscure the electronic content on a messaging interface upon detecting via a sensor feed of the second mobile messaging computer device an alternate biometric pattern not matching a second biometric profile associated with the second authorized user; and
display the electronic content of the electronic message upon verifying a biometric pattern received by a sensor feed of at least one sensor of the second mobile messaging computer device matches the second biometric profile associated with the second authorized user.

13. The at least one non-transitory computer-readable storage media of claim 12, wherein the first biometric profile and the second biometric profile are facial profile models of the first authorized user and the second authorized user respectively, and wherein the biometric pattern includes one or more features of a facial image.

14. A mobile computer device comprising:
at least one memory device storing a facial recognition biometric profile model of an authorized user;
at least one camera sensor for capturing a sensor feed;
a display for displaying a messaging interface; and
at least one processor, wherein said at least one processor is in communication with said at least one memory device, said at least one camera sensor, and said display, wherein said at least one processor programmed to:
receive, from a sender mobile computer device, an electronic message for the authorized user, wherein the electronic message includes an electronic content;
obscure the electronic content on the messaging interface upon detecting, via the sensor feed, a biometric pattern not matching the authorized user;
display the electronic content of the electronic message upon verifying a biometric pattern received by the sensor feed matches the facial recognition biometric profile model associated with the authorized user;
receive a response message from the authorized user; and
transmit the response message to the sender mobile computer device.

15. The mobile computer device of claim 14, wherein the at least one processor is further programmed to:
monitor the sensor feed;

detect more than one individual via the sensor feed; and
obscure the display upon detecting more than one individual.

16. The mobile computer device of claim 14, wherein the at least one processor is further programmed to:
receive, from the authorized user, a plurality of designated receivers including an authorized user of the sender mobile computer device; and
transmitting, to a plurality of receiver mobile computer devices corresponding to the plurality of designated receivers the electronic message, wherein each of the plurality of mobile receiver computer devices has a generated associated receiver biometric profile model for the corresponding designated receiver.

17. The mobile computer device of claim 16, wherein each receiver mobile computer device of the plurality of receiver mobile computer devices is configured to:
obscure the electronic content on the messaging interface upon detecting via a sensor feed of the receiver mobile computer device of the plurality of receiver mobile computer devices an alternate biometric pattern not matching the receiver biometric profile model for the designated receiver of the electronic message; and
display the electronic content of the electronic message upon verifying a biometric pattern received by a sensor feed of at least one sensor of the receiver mobile computer device matches the receiver biometric profile model for the designated receiver of the electronic message.

18. At least one non-transitory computer-readable storage media having computer-executable instructions embodied thereon, wherein when executed by at least one processor in communication with at least one memory device, the computer-executable instructions cause the processor to:
store a facial recognition biometric profile model of an authorized user;
receive, from a sender mobile computer device, an electronic message for the authorized user, wherein the electronic message includes an electronic content;
obscure the electronic content on a messaging interface upon detecting, via a sensor feed, a biometric pattern not matching the authorized user;
display the electronic content of the electronic message upon verifying a biometric pattern received by the sensor feed matches the facial recognition biometric profile model associated with the authorized user;
receive a response message from the authorized user; and
transmit the response message to the sender mobile computer device.

19. The method of claim 1, wherein the first mobile computer device is a smartphone, wherein the second mobile computer device is a smartphone, and wherein the electronic message is a multimedia messaging service (MMS) message.

20. The messaging system of claim 8, wherein the first mobile messaging computer device is a smartphone, wherein the second mobile messaging computer device is a smartphone, and wherein the electronic message is a multimedia messaging service (MMS) message.

* * * * *